United States Patent [19]
Neal et al.

[11] Patent Number: 5,946,470
[45] Date of Patent: Aug. 31, 1999

[54] METHOD AND APPARATUS FOR VOLTAGE LEVEL SHIFTING AND DESKEWING THE INPUTS TO A HIGH PERFORMANCE MICROPROCESSOR

[75] Inventors: James R. Neal, Cameron Park; Ted W. Pickerrell, Jr., Rancho Cordova; Louis W. Agatstein, Jr., El Dorado Hills, all of Calif.

[73] Assignee: Intel Corporation, Santa Clara, Calif.

[21] Appl. No.: 08/648,559

[22] Filed: May 15, 1996

[51] Int. Cl.$^6$ ................................................... G06F 13/42
[52] U.S. Cl. .......................... 395/500; 395/550; 395/309; 235/380
[58] Field of Search ..................................... 395/500, 550, 395/750, 558, 299, 309; 235/380, 382, 375

[56] References Cited

U.S. PATENT DOCUMENTS

| | | | |
|---|---|---|---|
| 5,133,064 | 7/1992 | Hotta et al. | 395/550 |
| 5,149,945 | 9/1992 | Johnson et al. | 235/380 |
| 5,239,318 | 8/1993 | Vannerson | 346/159 |
| 5,526,037 | 6/1996 | Cortjens et al. | 348/15 |
| 5,532,524 | 7/1996 | Townsley et al. | 307/64 |
| 5,535,398 | 7/1996 | Biggs et al. | 395/750 |
| 5,537,660 | 7/1996 | Bond et al. | 395/878 |
| 5,638,013 | 6/1997 | Iwata et al. | 327/126 |

OTHER PUBLICATIONS

Murakami et al., "Development of Digital Input Interface IC for Automotive Electronic Control Unit," IEEE, 1990, pp. 124–127.
Chandrakaran et al., "Design of Portable Systems", IEEE, 1994, pp. 259–266.
Databook, Cypress Semiconductor, High Performance Databook (May 1995), pp. 10–130 to 10–140.
Databook, National Semiconductor, Cross Volt Low Voltage Logic Series Databook (1994), pp. 7–7 to 7–9.
Databook, Quality Semiconductor Inc., QuickSwitch Products, 1995 QuickSwitch Products Databook, pp. 2–3 to 2–6, pp. 10–6 to 10–10.

Primary Examiner—Kevin J. Teska
Assistant Examiner—Thai Phan
Attorney, Agent, or Firm—Blakely, Sokoloff, Taylor & Zafman

[57] ABSTRACT

An upgrade integrated circuit is used in a board without redesigning the board. The board is operative at a first voltage level, and the upgrade integrated circuit is operative at a second voltage level. The method comprises the steps of intercepting a first set of signals originating from the board. These signals are shifted using a voltage level shifter to be operative at a second voltage level. The voltage level shifter, however, does not reside on the board. The voltage level shifted signals are provided to the upgrade integrated circuit. The upgrade integrated circuit and the voltage level shifter may reside on a processor card.

13 Claims, 9 Drawing Sheets

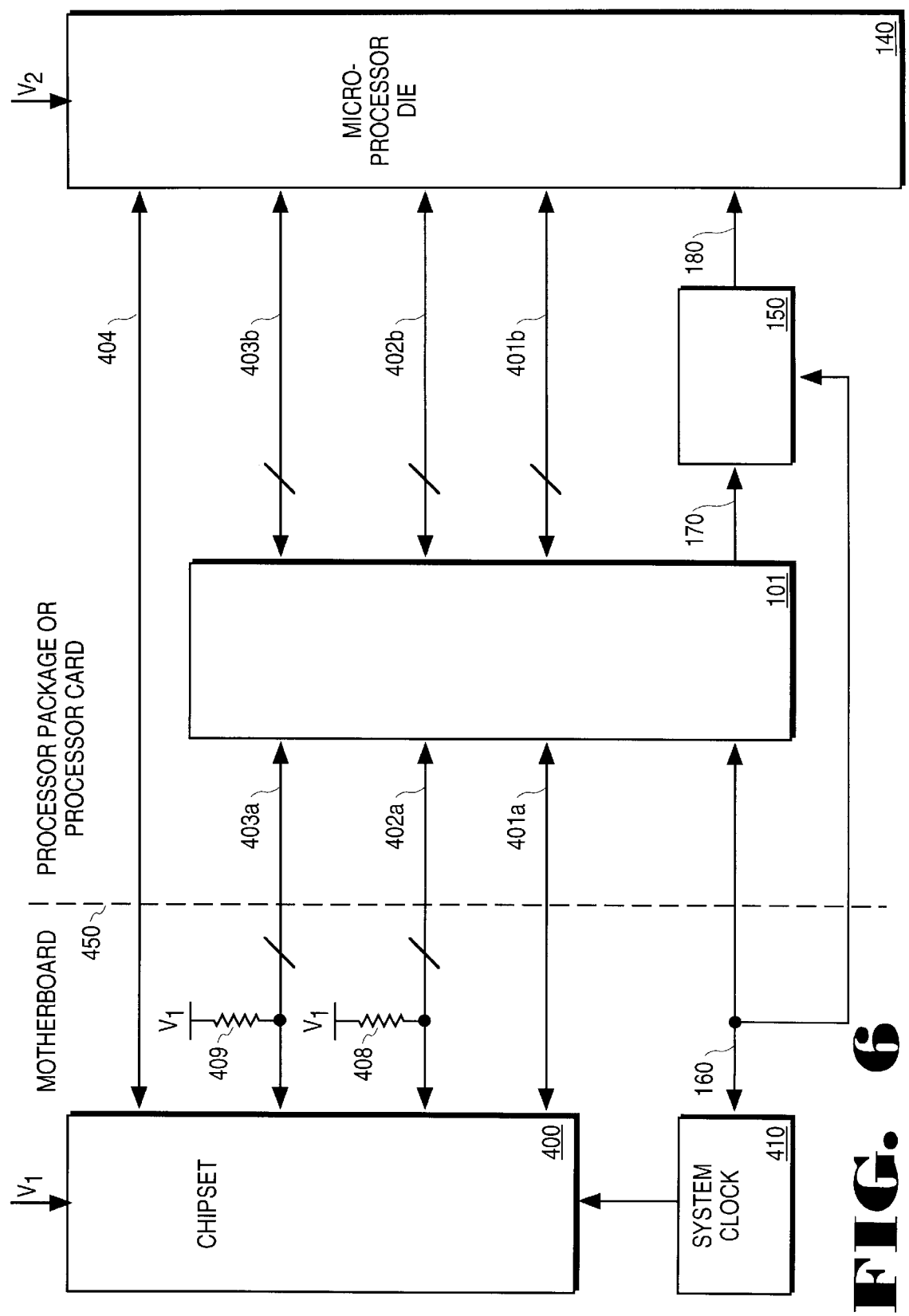

METHOD AND APPARATUS FOR VOLTAGE LEVEL SHIFTING AND DESKEWING THE INPUTS TO A HIGH PERFORMANCE MICROPROCESSOR

FIELD OF THE INVENTION

The present invention relates to the field of integrated circuits. More particularly, this invention relates to shifting the voltage levels of the inputs and/or outputs, and deskewing the clock(s) of an integrated circuit.

BACKGROUND OF THE INVENTION

Integrated circuits (ICs) historically were manufactured using a 5-volt process, wherein a voltage level of 5 volts indicated a "high," and 0 volts indicated a "low." As integrated circuits have become faster, and smaller transistor geometries have been implemented, powering the integrated circuits at lower voltages is required to prevent long term reliability degradation due to excessive voltage across the transistors' gate oxide.

Microprocessors, such as the INTEL Pentium® Processor, are examples of integrated circuits that have progressively been manufactured using lower voltage processes. Higher clock rates and correspondingly higher performance are made possible by smaller transistor geometries. For example, Pentium processors are available which operate at 5V, 3.3V, and 2.9V. The inputs and outputs of the microprocessor (I/O buffers) are referenced to the power supply, thus a 5V microprocessor typically drives and receives 5V levels, while a 3.3V microprocessor typically drives and receives 3.3V levels, and a 2.9V or lower power supply microprocessor typically drives and receives 2.9V levels.

Additionally, microprocessors may be developed which operate at lower voltages than 2.9V.

It is sometimes desirable to upgrade a microprocessor with a more recent one. A problem results if the upgrade microprocessor is manufactured with a lower voltage process than that of the original. This is because the inputs and outputs of the upgrade microprocessor may not be compatible with the voltage level of the circuit board into which the microprocessor is being replaced.

For example, if a motherboard were designed for a 3.3 V microprocessor, and the motherboard is to be upgraded at some later time to a 2.5 V (or lower) upgrade microprocessor, a problem arises because the upgrade microprocessor cannot be swapped directly. If the 3.3 Volt signals on the motherboard were directly input to the 2.5 V upgrade microprocessor, this could cause long term reliability problems for the 2.5 V upgrade microprocessor.

Some inputs and outputs of the upgrade microprocessor may by design have buffers that are tolerant of voltages higher than the power supply voltage of the microprocessor. For example, an Intel Pentium microprocessor may operate at 3.3 V but be tolerant of 5.0 V signals. Some I/O buffers of the microprocessor, however, do not have a tolerance for high voltage signals supplied by the motherboard. To maintain compatibility, a way of providing a lower input voltage to the I/O buffers is needed.

One method to provide the upgrade microprocessor compatibility with the motherboard is by redesigning the I/O buffers of the upgrade microprocessor so that they are tolerant of higher voltages. This, however, adds more complexity and expense to the cost of making the upgrade microprocessor.

An alternative method to provide the upgrade microprocessor compatibility is by redesigning the motherboard with a voltage level shifter. The voltage level shifter is positioned between signals on the motherboard and the inputs and outputs of the upgrade microprocessor. Various voltage level shifters, also called voltage translators or bus switches, are available on the market. For example, Quality Semiconductor sells voltage level shifters QS3384 and QS3L384, and National Semiconductor sells the 74LVX3L384. Placing the voltage level shifter on the motherboard decreases the amount of real estate available. Also, this is not possible for a processor installed at a later date.

FIG. 1 shows a configuration for a voltage level shifter 10 coupled between two devices 12 and 14. The first device 12 operates at a higher voltage range than the second device 14. For example, the first device 12 can be a chipset that generates signals in a voltage range of 0 to 5.0 V. The second device 14 can be a microprocessor operating in a voltage range of 0 to 3.3 V. The first device is coupled to the voltage level shifter via a signal line 20. The signal line 20 is coupled via the voltage level shifter to signal line 22, which is coupled to an input of the second device 14. The first device 12 is also coupled to the voltage level shifter 10 via a signal line 30. The signal line 30 is coupled via the voltage level shifter 10 to signal line 32, which is coupled to an input/output (I/O) or an output of the second device 14. A pull-up resistor 40 couples the signal line 30 to a voltage level of the first device 12, i.e., 5.0 V level.

The voltage level shifter 10 is able to shift voltages bidirectionally. With regard to signals coming from the first device 12, the voltage level shifter 10 lowers the voltage level of a signal operating in a first voltage range to provide a signal operating in a second voltage range. With regard to signals coming from the second device, the voltage level shifter provides an output signal operating in the first voltage range of the first device. The voltage level shifter 10 uses a pull-up resistor to provide an output signal in the first voltage range, wherein an open-drain or open-collector output of the second device allows the pull-up resistor to raise the voltage level. In either case, the output acts as an open circuit for a "high" level, and the output is connected to ground for a "low" level. Referring back to FIG. 1, when the second device 14 has its output in the "open" state driven to the voltage level shifter 10 on signal line 32, the signal line 30 is pulled up to the voltage level of the first device because of the pull-up resistor. When the second device 14 grounds its output to the voltage level shifter 10 on signal line 32, the voltage level shifter 10 provides a grounded output on signal line 30.

Thus, for decreasing the voltage level, the voltage shifter receives a signal at the higher voltage range and provides a signal at the lower voltage range. For increasing the voltage level, however, the voltage shifter receives an input which is open. In response to the open input, the voltage level shifter provides a signal at the higher voltage range by way of a pull-up resistor.

A voltage level shifter can be set up to level shift voltages to a particular voltage level based upon a voltage level input and based upon the voltage level to which the pull-up resistor is coupled.

SUMMARY AND OBJECTS OF THE PRESENT INVENTION

An object of this invention is to provide an improved method for using an upgrade integrated circuit in a board Another object of the invention is to provide an upgrade integrated circuit on a processor card, wherein signals of the upgrade integrated circuit are voltage level shifted.

A method of using an upgrade integrated circuit in a board without redesigning the board is described. The board is operative at a first voltage level, and the upgrade integrated circuit is operative at a second voltage level. The method comprises the steps of intercepting a first set of signals originating from the board. These signals are shifted using a voltage level shifter to be operative at a second voltage level. The voltage level shifter, however, does not reside on the board. The voltage level shifter resides on a processor package, a processor card, or on an interposer. The voltage level shifted signals are provided to the upgrade integrated circuit.

Other objects, features, and advantages of the present invention will be apparent from the accompanying drawings and from the detailed description that follows below.

BRIEF DESCRIPTION OF THE DRAWINGS

FIG. 6 is a block diagram showing the electrical connections for coupling a voltage level shifter to a microprocessor.

DETAILED DESCRIPTION

An apparatus and method for using an upgrade integrated circuit in a motherboard without redesigning the motherboard are described. In the following description, a motherboard is not restricted to a computer system. A motherboard can be a circuit board used in, e.g., a cellular phone, a personal digital assistant, an Internet/TV appliance, and so forth.

Figure 1:
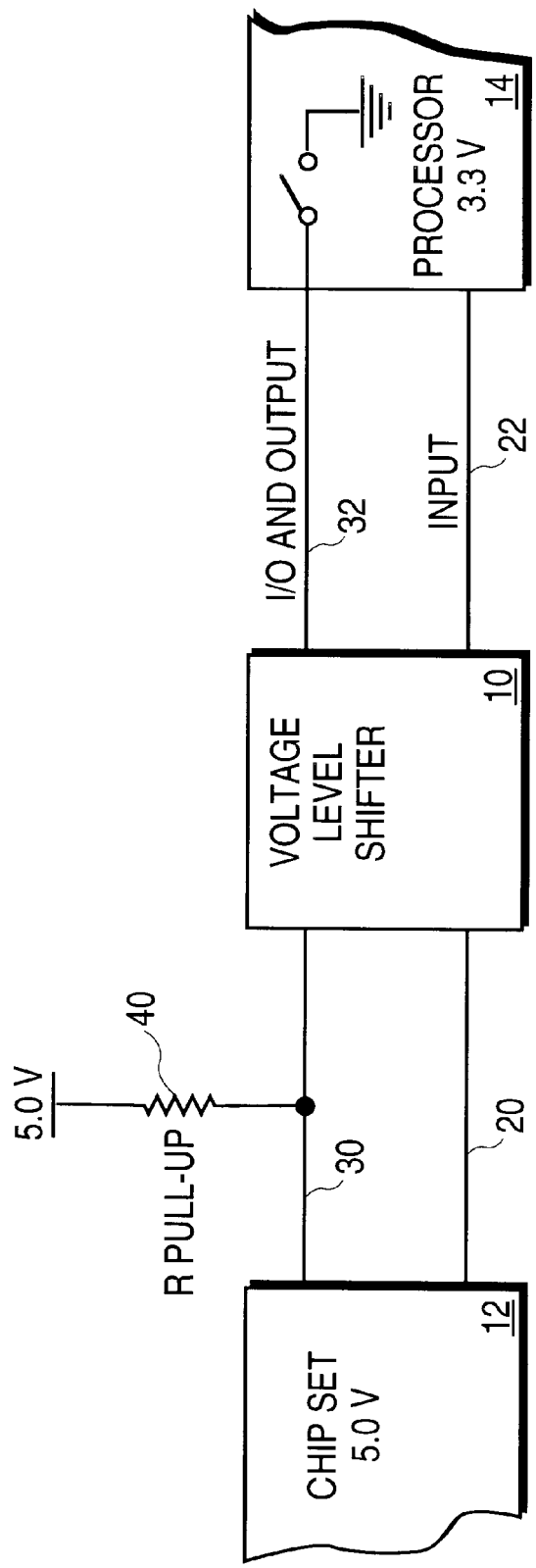
FIG. 1 shows a configuration for a voltage level shifter coupled between two devices.
Figure 2:
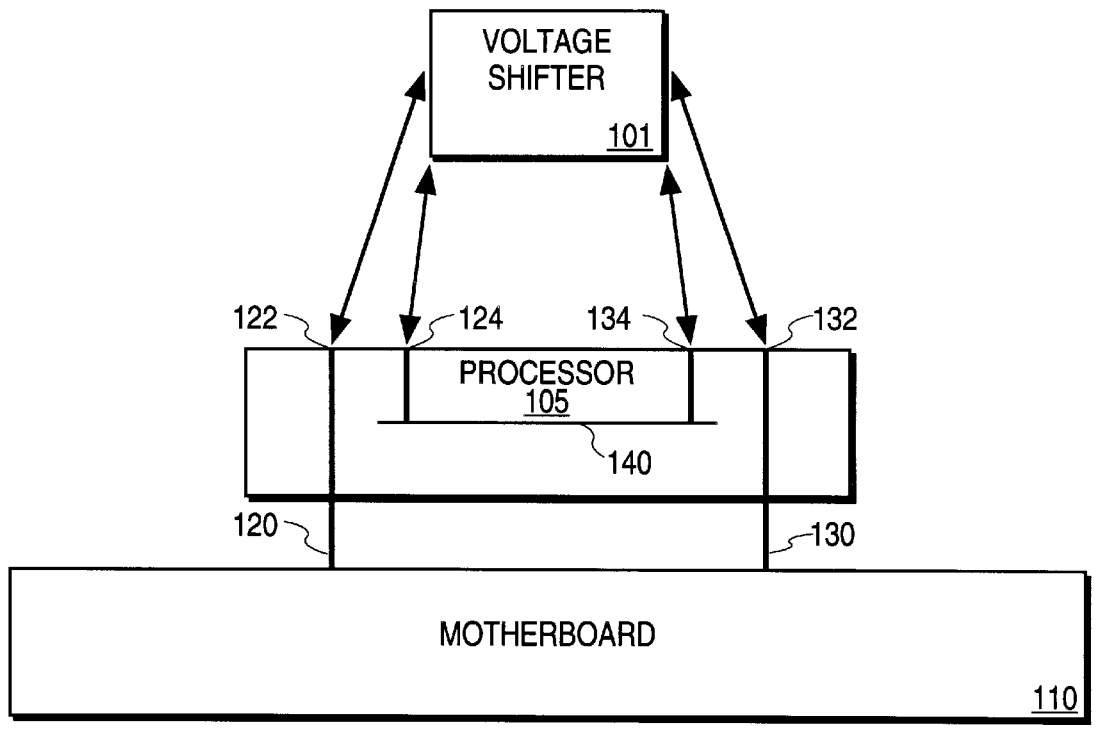
FIG. 2 is a diagram of one embodiment of a voltage level shifter coupled to a microprocessor.

FIG. 2 is a diagram of one embodiment of a voltage level shifter 101 coupled to a microprocessor 105. The microprocessor 105 is coupled to a motherboard 110. The microprocessor has a plurality of contacts for coupling to the motherboard. These contacts take many forms. They can be pins of a pin grid array of a ceramic package, leads of a plastic package that are soldered to the motherboard, or numerous other contacts for coupling a microprocessor to a motherboard which are well known in the art.

FIG. 2 illustrates two exemplary leads 120 and 130. Leads 120 and 130 couple signals between the microprocessor 105 and the motherboard 110. The leads 120 and 130 are electrically coupled within the microprocessor package to contacts 122 and 132, respectively, on the top side of the microprocessor. Contacts 124 and 134 are also provided on the top side of the microprocessor. The contacts 124 and 134 are electrically coupled to the die 140 of the microprocessor. The voltage level shifter 101 is coupled between contacts 122 and 124 to level shift an input provided from either contact 122 or 124. The voltage level shifter 101 is also coupled between contacts 132 and 134 to level shift an input provided from either of the contacts 132 or 134.

For one embodiment the voltage level shifter is surface mounted to the microprocessor 105 and is held in place by solder connections to the contacts of the microprocessor.

For one embodiment, only the inputs of the microprocessor are voltage level shifted. For another embodiment, only the outputs of the microprocessor are voltage level shifted. For yet another embodiment, the inputs and outputs are level shifted. Additionally, one or more clock signals may also be level shifted.

For ease of reference, the phrase "a signal operative at 3.3 volts" is meant to signify that the signal ranges from 0 to 3.3 volts, wherein 3.3 V is a "high," and 0 V is a "low." A signal operative at 1.8 volts signifies that the signal ranges from 0 to 1.8 V, wherein 1.8 V is a "high," and 0 V is a "low."

For one embodiment, the motherboard operates at a voltage of 3.3 volts and the microprocessor operates at 1.8 volts internally. The signals provided to the microprocessor 105 from the motherboard range from 0 volts to 3.3. volts. If the microprocessor's buffers have a tolerance up to 2.5 volts, then the microprocessor can accept signals having a range from 0 volts to 2.5 volts.

For this embodiment, if a signal originating on the motherboard and operative at 3.3 volts is provided through contact 120 and contact 122 to the voltage level shifter 101, the voltage level shifter will provide a signal operative at 2.5 volts to contact 124. Similarly, an open-drain or open-collector output from the microprocessor 105 provided via contact 124 to the voltage level shifter 101 results in a signal operative at 3.3 volts back to contact 122, which is also provided to contact 120 and the motherboard.

For this embodiment, the voltage level shifter 101 does not voltage level shift the outputs all the way down to the operating voltage range of the microprocessor 105, but only voltage level shifts the signals to a range that the microprocessor 105 can tolerate without causing long term reliability problems. This provides a margin, for example, in case there is noise on the signal lines, to guarantee that a high signal is over a certain threshold. For another embodiment, the voltage level shifter shifts signals from the higher voltage of the motherboard all the way down to the operating voltage of the microprocessor despite the microprocessor having a higher tolerance on its buffers, i.e., in this case, from 3.3 V to 1.8 V for inputs of the microprocessor. For another embodiment, the microprocessor is operative at 2.5 V and can only tolerate signals up to 2.5 V, the motherboard is operative at 3.3 V, and the voltage level shifter shifts signals from 3.3 V to 2.5 V for inputs of the microprocessor.

Figure 3:
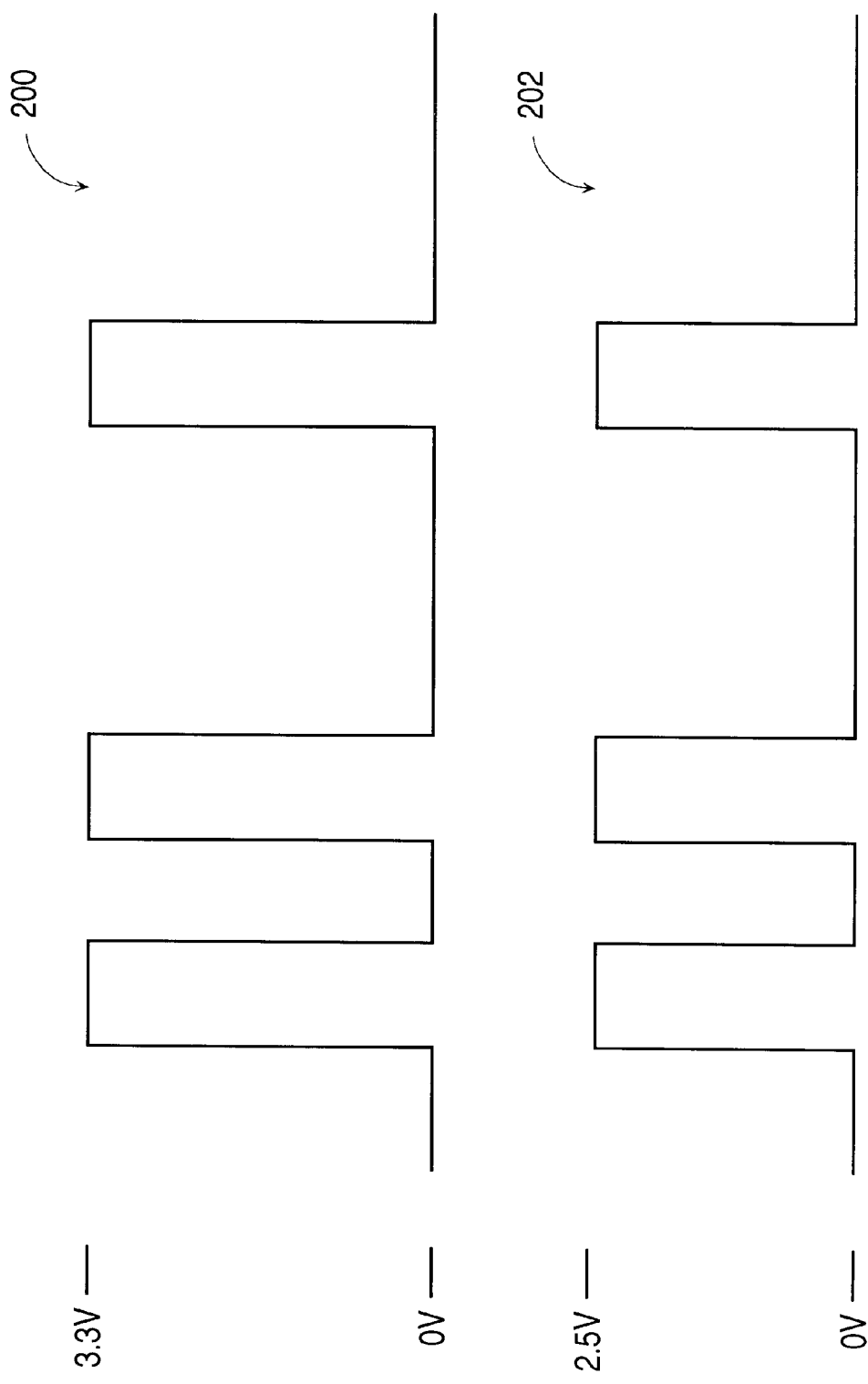
FIG. 3 is a timing diagram showing a sample signal operative at a first voltage level and the same sample signal operative at a second voltage level.

FIG. 3 is a timing diagram showing a sample signal operative at a first voltage level (e.g., 3.3 V) and the same sample signal operative at a second voltage level (e.g., 2.5 V). If signal 200 is presented from contact 122 to the voltage level shifter, the voltage level shifter will respond by providing the level shifted signal 202 to the contact 124, and subsequently to the die 140 of the microprocessor. Similarly, if an open-collector or open-drain buffer on the microprocessor die 140 provides an output at contact 124 to the voltage level shifter 101, the voltage level shifter will provide a level shifted signal 200 to the contact 122 and subsequently to the motherboard, wherein the level shifted signal 200 is operative at the first voltage level (i.e., 3.3 V).

Even though the voltage level shifter provides an output at a different voltage level than the device providing the input to the voltage level shifter, the signal integrity is maintained such that a "high" input signal will correspond to a "high" signal at the shifted voltage level. Similarly, a "low" input signal will correspond to a "low" signal at the shifted voltage level. Some delay, however, may be introduced by the voltage level shift, as will be addressed with respect to FIG. 4.

The microprocessor includes one or more power supply pins for providing power to the microprocessor from the motherboard. A voltage regulator, which is different from a voltage level shifter, may be required to lower the voltage provided by the power supply pins.

Figure 4:
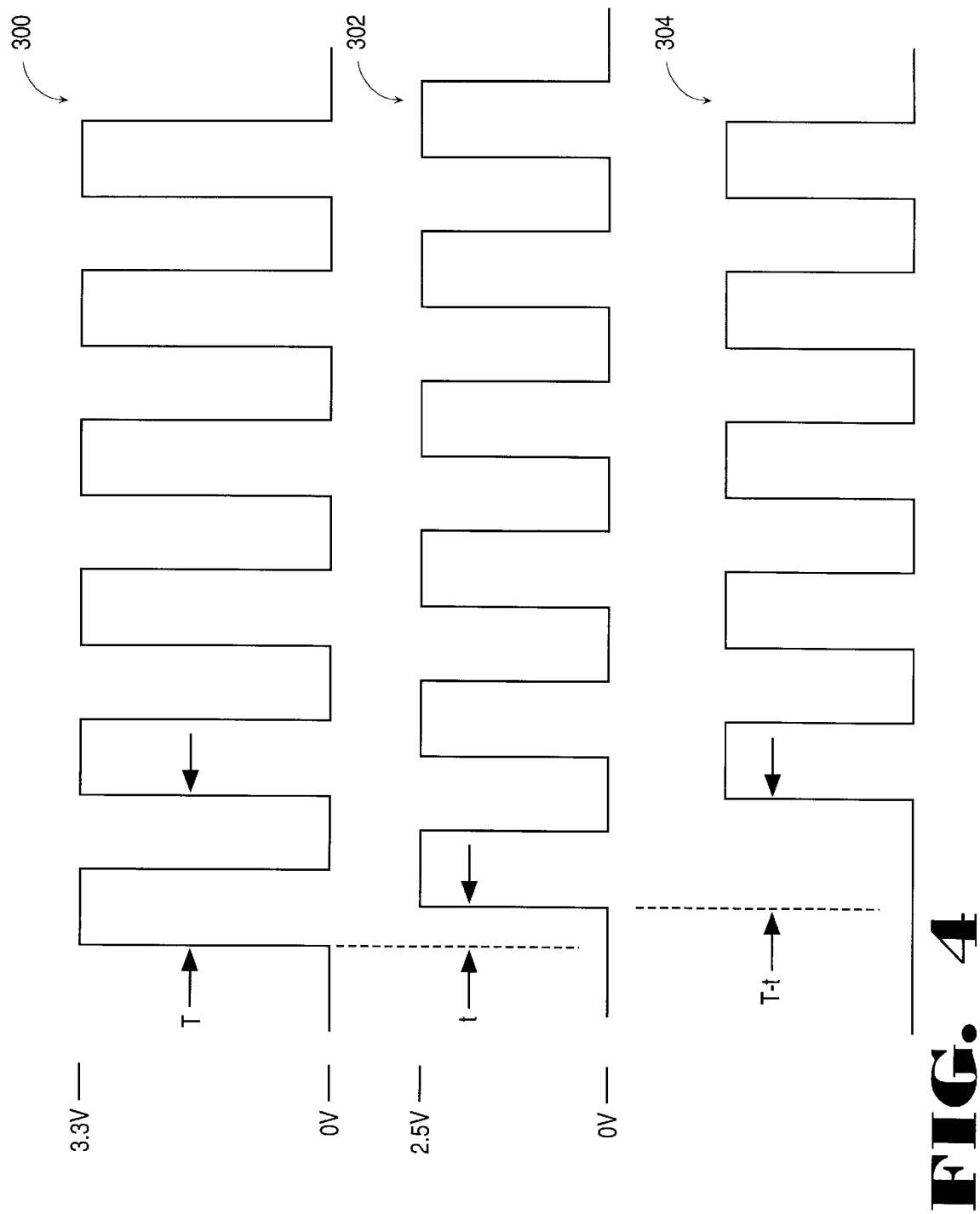
FIG. 4 is a timing diagram showing that a shifted voltage level signal can be resynchronized to a clock signal.

FIG. 4 is a timing diagram showing that a clock signal that has been voltage level shifted can be resynchronized to the original clock signal, i.e., the clock signal that was input to the voltage level shifter. The voltage level shifter 101, in shifting signal 300 to signal 302, may cause a delay, t, from the timing of the original signal. This delay may need to be effectively eliminated in order to avoid timing issues, especially in a synchronous system. Signal deskewers are well known in the prior art. They are used to correct the skew of a clock signal. A signal deskewer has a clock input and uses an internal timing mechanism such as a phase lock loop circuit.

A signal deskewer can be used to compensate for the delay t by adding a second delay (T−t) to the signal 302, wherein T is equal to any integer number of clock periods. Thus, when signal 302 is provided to the signal deskewer, the signal 304 is output from the signal deskewer such that the output signal has been resynchronized to the original clock signal 300 that was input to the voltage level shifter. Deskewing realigns the rising and falling edges of the microprocessor's clock signal to match the rising and falling edges of the clock signals of the other components of the motherboard. A microprocessor may have more than one clock signal which may need to be deskewed.

Figure 5:
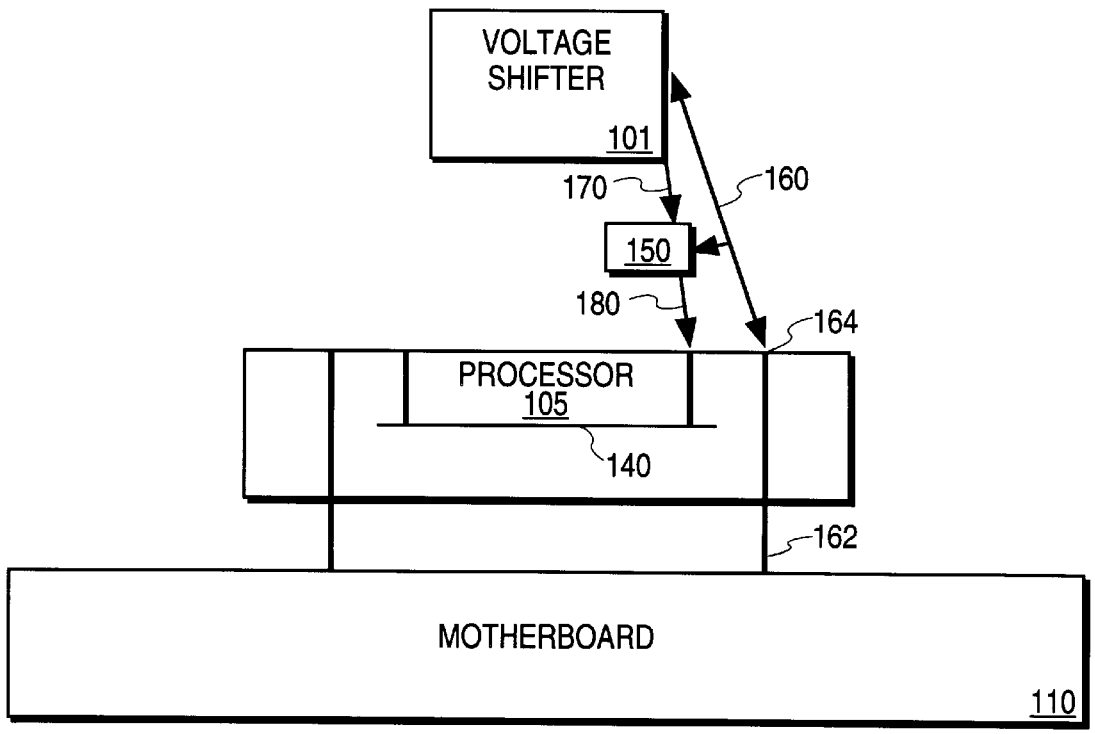
FIG. 5 shows a signal deskewer coupled between the voltage level shifter and the microprocessor of FIG. 1.

FIG. 5 shows a signal deskewer 150 coupled between the voltage level shifter 101 and the microprocessor 105 of FIG. 2. Other signals of FIG. 2 are not shown in FIG. 5 to more clearly show the operation of the signal deskewer. System clock 160 originates on the motherboard 110. The system clock is coupled to the microprocessor via lead 162. The system clock is routed through the microprocessor package and provided to a contact 164 on the top side of the microprocessor. The system clock is then provided as an input to both the voltage level shifter 101 and the signal deskewer 150. For one embodiment, the signal deskewer 150 is coupled to deskew all voltage shifted clock inputs to the microprocessor.

A voltage shifted system clock signal 170 is output from the voltage level shifter and is provided as an input to the signal deskewer 150. The signal deskewer 150 provides a deskewed clock output 180 that is provided via a contact on top of the microprocessor to the die 140 of the microprocessor.

FIG. 6 is a block diagram showing the electrical connections for coupling a voltage level shifter 101 to a microprocessor die 140. Chipset 400 provides one or more signals via signal lines 401a to the voltage level shifter 101, which provides voltage level shifted input signals to the microprocessor die 140 via signal lines 401b. The microprocessor die 140 provides one or more output signals via signal lines 402b to the voltage level shifter 101, which provides shifted voltage level signals via signal lines 402a to the chipset 400.

The microprocessor die 140 is also coupled to chipset 400 for providing and receiving input/output (I/O) signals via the voltage level shifter 101 and signal lines 403a and 403b.

Signal lines 402a and 403a are each coupled via pull-up resistors 408 and 409 to the voltage level of the chipset 400.

Additionally, one or more signals 404 may be compatible with the microprocessor and are coupled directly between the microprocessor die 140 and the chipset 400 without being coupled to the voltage level shifter. For one embodiment, the signals 404 are coupled to I/O buffers of the microprocessor that are tolerant of high voltage inputs. For another embodiment, the signals 404 are GTL signals which may be compatible with the upgrade microprocessor without being coupled to the voltage level shifter.

A system clock 410 provides one or more clock inputs 160 to the voltage level shifter 101 and to the signal deskewer 150. The voltage level shifter 101 provides one or more voltage level shifted clock signals at signal line 170 to the clock deskewer 150, which provides one or more deskewed clock signals 180 to the processor die.

For one embodiment, the chipset 400 operates at a voltage V1, and the microprocessor 140 operates at a voltage V2. A voltage regulator (not shown) is used to convert the voltage V1 to the voltage V2 for supplying power to the microprocessor 140. The voltage regulator can reside on the motherboard, the processor card, the processor package, or on an interposer which will be described with respect to FIG. 10.

A dividing line 450 separates components residing on the motherboard from components residing on the processor package. For one embodiment, the voltage level shifter 101 and the signal deskewer 150 are mounted to the processor package as shown in FIGS. 2 and 5. For another embodiment, the components on the right side of the dividing line 450 reside on a processor card.

Figure 7:
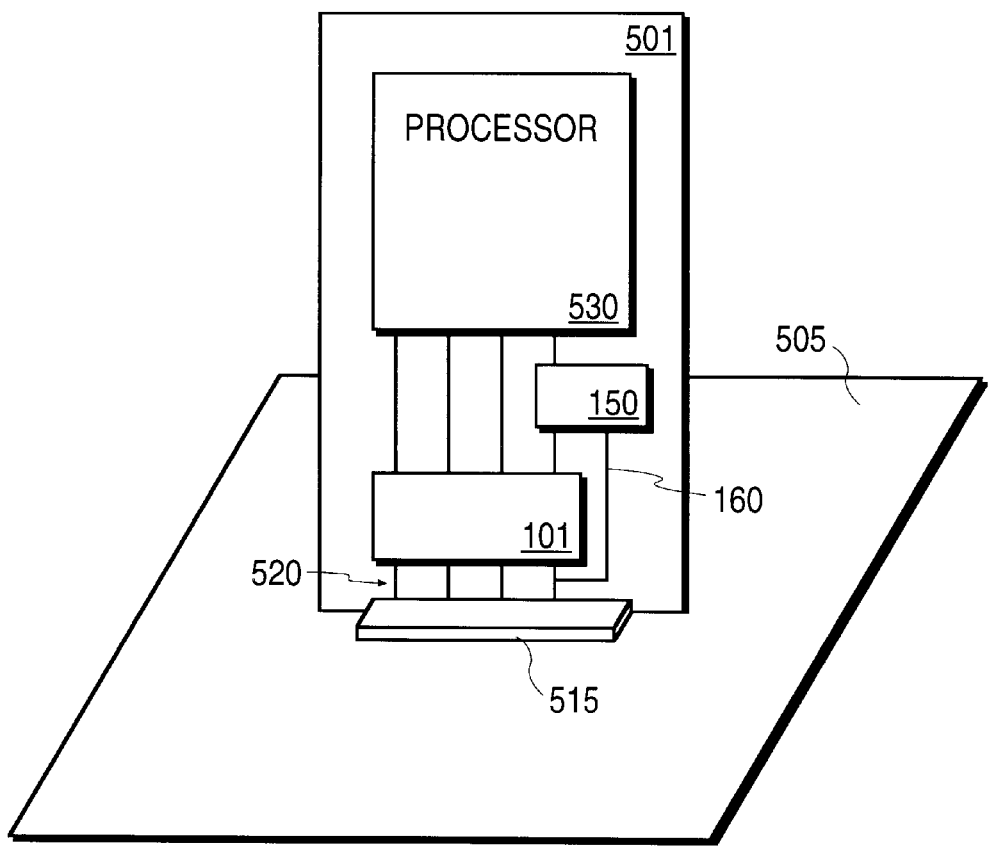
FIG. 7 shows an embodiment of a processor card attached to a motherboard, wherein a voltage level shifter resides on the processor card.

FIG. 7 shows an embodiment of a processor card 501 attached to a motherboard 505, wherein a voltage level shifter 101 resides on the processor card. The processor card is detachably coupled to the motherboard via a connector 515. The connector 515 couples electrical signals from the motherboard to the processor card. For one embodiment, the processor card takes the place of a microprocessor installed directly on the motherboard.

One or more signals 520 are coupled between the connector 515 and the voltage level shifter 101. These signals are then coupled to the microprocessor 530. Any clock signals that require deskewing are provided by the voltage level shifter 101 to the signal deskewer 150. A non-voltage level shifted clock signal 160 is coupled from the connector 515 to the signal deskewer 150. The signal deskewer 150 resynchronizes the voltage level shifted clock signals that were output from the voltage level shifter 101 to the non-voltage level shifted clock signal 160, in a similar manner as was described with respect to FIGS. 5 and 6. Additionally, one or more signals (not shown) may be coupled directly from the connector 515 to the microprocessor 530.

Figure 8:
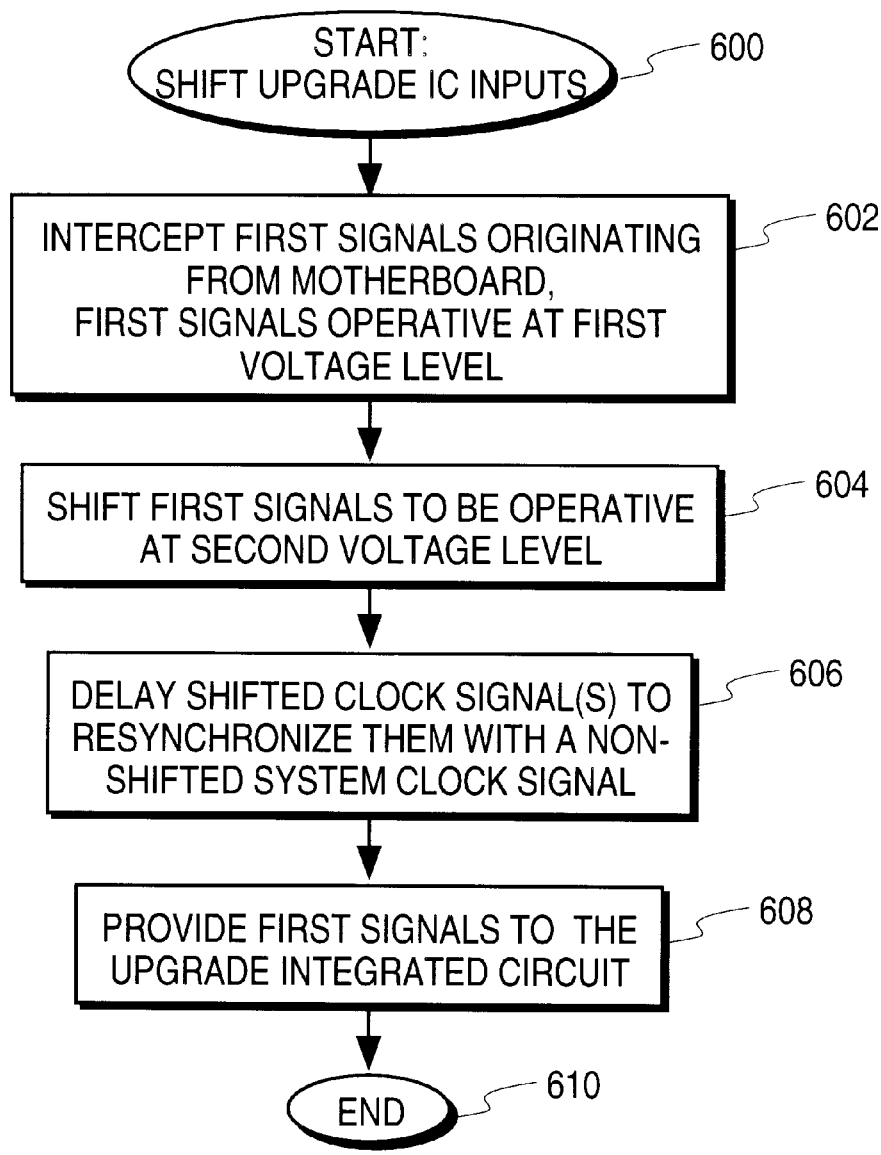
FIG. 8 is a flowchart showing the steps of voltage shifting the inputs to an upgrade integrated circuit.

FIG. 8 is a flowchart showing the steps of voltage shifting the inputs to an upgrade integrated circuit. The flowchart starts at a block 600, from which operation continues at block 602. At block 602, a first set of signals originating from the motherboard are intercepted. The first set of signals are operative at a first voltage level.

From block 602, operation continues at block 604, at which the first set of signals are level shifted by the voltage level shifter to be operative at the second voltage level. Operation continues at block 606, at which one or more voltage level shifted clock signals are deskewed by resynchronizing them with a non-voltage level shifted system clock. Step 606 is optional, however, because it may not need to be performed dependent upon the timings of the microprocessor, the motherboard, and the voltage level shifter.

From block 606, operation continues at block 608, at which the first set of signals are provided to the upgrade integrated circuit. Operation continues at block 610, at which the flowchart terminates.

Figure 9:
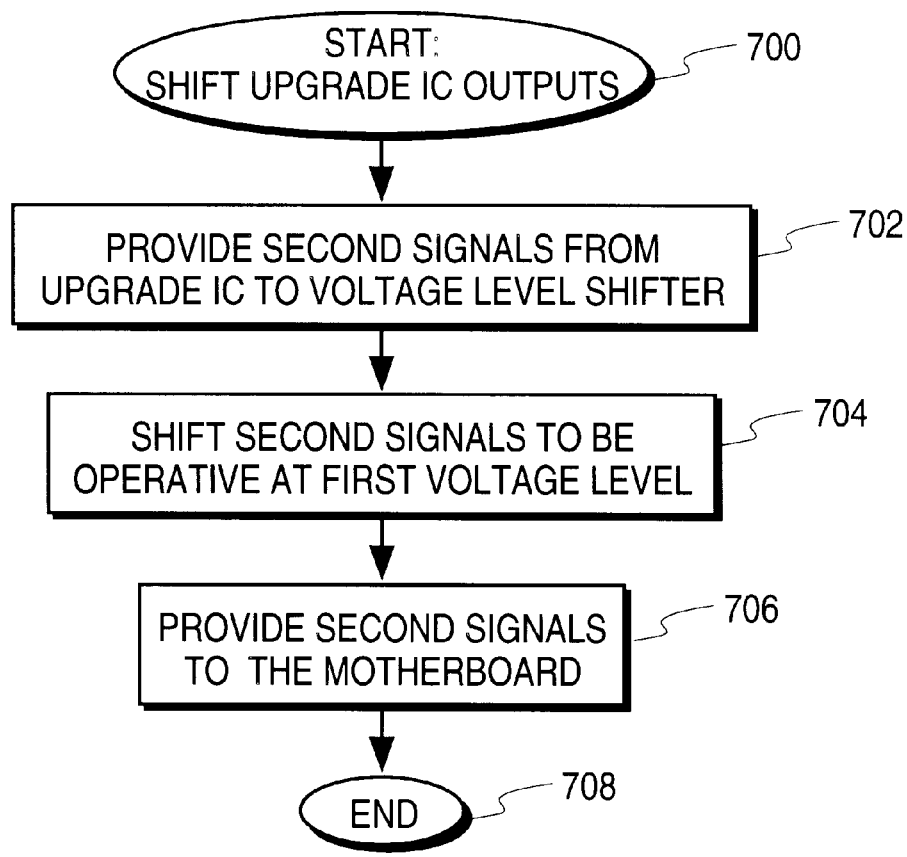
FIG. 9 is a flowchart showing the steps of voltage shifting the outputs from an upgrade integrated circuit.

FIG. 9 is a flowchart showing the steps of voltage shifting the outputs from an upgrade integrated circuit. The flowchart starts at block 700, from which it continues at block 702. At block 702, a second set of signals are provided by the upgrade integrated circuit to the voltage level shifter. The upgrade integrated circuit drives its output as an open circuit to represent a "high" and grounds its output to represent a "low."

From block 702, operation continues at block 704, at which the second set of signals are voltage level shifted to be operative at a first voltage level. From block 704, operation continues at block 706, at which the second set of signals are provided to the motherboard. From block 706, operation continues at block 708, at which the flowchart terminates.

The processes shown in the flowcharts of FIG. 8 and FIG. 9 can operate concurrently on two different set of signals, or the processes of the flowcharts can also operate on the same set of signals which are, at certain times, inputs to, and at other times, outputs from the upgrade integrated circuit.

Figure 10:
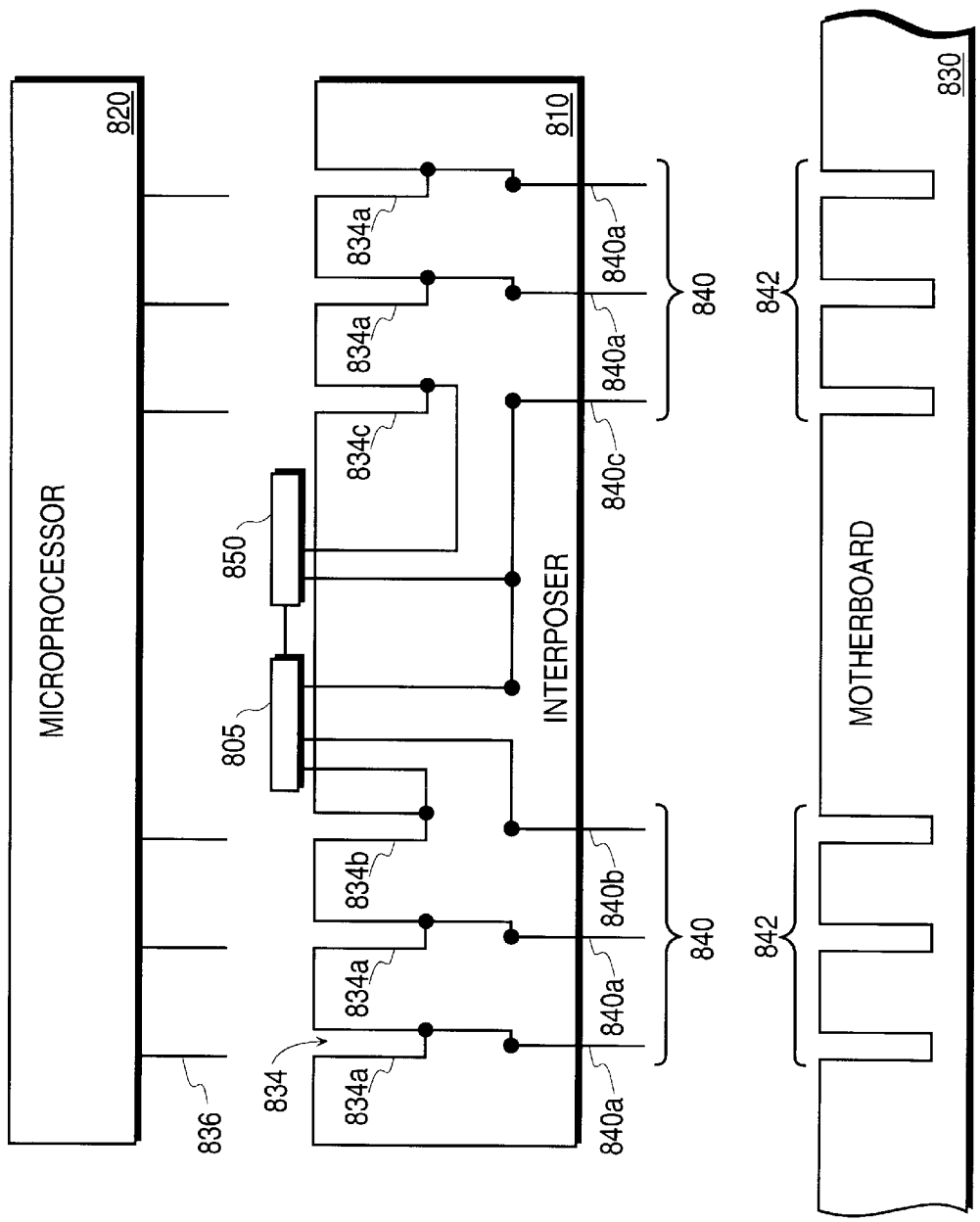
FIG. 10 is a cross-sectional representation showing an embodiment of the voltage level shifter residing on an interposer.

FIG. 10 is a cross-sectional representation showing an embodiment of the voltage level shifter 805 residing on an interposer 810. An interposer 810 is placed in between a microprocessor 820 and a motherboard 830. The interposer 810 has receptacles 834 for coupling to the pins 836 of the microprocessor 820. The interposer includes pins 840 for coupling to receptacles 842 of the motherboard 830.

Some of the interposer receptacles 834*a* are coupled directly to an associated pin of the interposer 840*a*. Other interposer receptacles 834*b* are coupled to an associated pin 840*b* of the interposer via the voltage level shifter 805. The voltage level shifter 805 voltage level shifts signals provided from the motherboard 830 to the microprocessor 820, and from the microprocessor 820 to the motherboard 830. For one embodiment, the voltage level shifter 805 sits on the interposer and is sandwiched between the microprocessor 820 and the interposer 810. For another embodiment, the interposer 810 is larger than the microprocessor 820, and the voltage level shifter 805 sits on a portion of the interposer which is not directly underneath the microprocessor 820.

A clock signal is provided from the motherboard 830 to the interposer 810 via a pin 840*c*. The clock signal is voltage level shifted by the voltage level shifter 805 and provided to a clock deskewer 850 which resides on the interposer 810. The clock deskewer 850 deskews the output from the voltage level shifter 805 and provides a resynchronized clock signal to the receptacle 834*c* in a manner previously described.

In the foregoing specification, the invention has been described with reference to specific exemplary embodiments thereof. It will, however be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor card comprising:
 a processor having a first set of inputs and outputs;
 a connector for detachably coupling the processor card to a board;
 a voltage translator coupled to shift a voltage level of one or more signals transferred between the connector and the processor; and
 a signal deskewer coupled between the voltage translator and the processor to resynchronize at least one of the one or more voltage level shifted signals transferred between the processor and the connector,
 wherein said processor card is operable to substitute an upgrade integrated circuit for a first integrated circuit on said board.

2. A system comprising:
 a board operative at a first voltage level; and
 a processor card detachably coupled to the board via a connector, the processor card comprising,
 a processor operative at a second voltage level;
 a voltage translator coupling one or more electrical connections of the connector with one or more inputs and outputs of the processor; and
 a signal deskewer coupled between the voltage translator and the one or more inputs and outputs of the processor to resynchronize one or more voltage level shifted signals transferred between the voltage translator and the processor, wherein said processor card is operable to substitute an upgrade integrated circuit for a first integrated circuit on said board.

3. A method comprising the steps of:
 (a) substituting an upgrade integrated circuit for a first integrated circuit in a board;
 (b) coupling a voltage level shifter between said upgrade integrated circuit and said board, said board containing circuits operating at a first voltage level, said upgrade integrated circuit containing circuits operating at a second voltage level, wherein said voltage level shifter is mounted directly on one surface of said upgrade integrated circuit;
 (c) intercepting a first set of signals originating from the board in said voltage level shifter, the first set of signals operative at the first voltage level;
 (d) using said voltage level shifter to shift the first set of signals to be operative at the second voltage level, said voltage level shifter delaying at least one of the first set of signals to resynchronize the at least one of the first set of signals to a system clock; and
 (e) providing the first set of signals operative at the second voltage level to the upgrade integrated circuit.

4. The method of claim 3 wherein the upgrade integrated circuit is operative at a third voltage level but tolerates signals at the second voltage level, wherein the third voltage level is lower than the second voltage level.

5. The method of claim 3 further comprising the steps of:
 (f) providing a second set of signals originating from the upgrade integrated circuit to the voltage level shifter;
 (g) shifting the second set of signals to be operative at the first voltage level; and
 (h) providing the second set of signals operative at the first voltage level to the board,
 wherein the steps (f)–(h) operate concurrently with steps (c)–(e).

6. The method of claim 3 wherein the voltage level shifter is surface mounted on a top surface of the upgrade integrated circuit.

7. A method of providing a shifted voltage level input to an integrated circuit device, the method comprising the steps of:

(a) substituting said integrated circuit device for a first integrated circuit in a board;

(b) receiving at a first lead of the integrated circuit device a first signal as an input to the integrated circuit device, wherein the first signal is operative at a first voltage level;

(c) providing the first signal out of the integrated circuit device at a second lead of the integrated circuit device to a voltage level shifter mounted to a surface of the integrated circuit device;

(d) shifting the first signal to a second signal operative at a second voltage level;

(e) delaying the second signal to resynchronize the second signal to a system clock; and (f) providing the second signal as the shifted voltage level input to the integrated circuit device at a third lead of the integrated circuit device.

8. The method of claim 7 wherein the step (e) further comprises the step of delaying the second signal by up to any integer number of clock periods to resynchronize the second signal to a system clock.

9. The method of claim 7 wherein the voltage level shifter is surface mounted on top of the integrated circuit device.

10. The method of claim 7 wherein the integrated circuit device is a microprocessor, and the second voltage level is lower than the first voltage level.

11. The method of claim 7 wherein the first lead is on one side of the integrated circuit device, and the second lead and third lead of the integrated circuit device are on an opposite side of the integrated circuit device.

12. A method comprising the steps of:

(a) substituting an upgrade integrated circuit for a first integrated circuit in a board;

(b) receiving a first set of signals originating from the board, the first set of signals operative at the first voltage level;

(c) using a voltage level shifter to shift the first set of signals to be operative at a third voltage level, the voltage level shifter delaying at least one of the first set of signals to resynchronize the at least one of the first set of signals to a system clock, wherein the voltage level shifter does not reside on the board; and (d) providing the first set of signals operative at the third voltage level to the upgrade integrated circuit, wherein the first voltage level is higher than the third voltage level, and the third voltage level is higher than the second voltage level and wherein the voltage level shifter is surface mounted on a top surface of the upgrade integrated circuit.

13. An apparatus comprising:

an interposer to substitute an upgrade integrated circuit for a first integrated circuit on a board, and operable to be coupled between a surface of said upgrade integrated circuit and a motherboard, said interposer comprising a voltage level shifter;

a plurality of first receptacles, said plurality of first receptacles operable to couple to pins of said upgrade integrated circuit;

a plurality of first pins directly coupled to the plurality of first receptacles, said plurality of first pins operable to couple to receptacles on said motherboard;

a plurality of second receptacles;

a plurality of second pins coupled to the plurality of second receptacles via the voltage level shifter; and a clock deskewer coupled to an output of the voltage level shifter, the clock deskewer providing an output coupled to one of the plurality of second receptacles.

* * * * *

UNITED STATES PATENT AND TRADEMARK OFFICE
CERTIFICATE OF CORRECTION

PATENT NO. : 5,946,470
DATED : August 31, 1999
INVENTOR(S) : Neal et al.

It is certified that error appears in the above-identified patent and that said Letters Patent is hereby corrected as shown below:

Column 6,
Line 2, delete "(1/0)" and insert -- (I/O) --.

Signed and Sealed this

Twenty-fifth Day of March, 2003

JAMES E. ROGAN
*Director of the United States Patent and Trademark Office*